June 2, 1970 D. O. SMITH 3,516,080

MAGNETO-OPTICAL MEMORY SENSING USING THERMAL MODULATION

Filed July 26, 1967 2 Sheets-Sheet 1

INVENTOR
DONALD O. SMITH
BY
Edward D. Thomas.
AGENT

3516080
OR IN 365/122

June 2, 1970 D. O. SMITH 3,516,080
MAGNETO-OPTICAL MEMORY SENSING USING THERMAL MODULATION
Filed July 26, 1967 2 Sheets-Sheet 2

INVENTOR
DONALD O. SMITH
BY,
Edward D. O'Brian
AGENT

United States Patent Office 3,516,080

Patented June 2, 1970

3,516,080

MAGNETO-OPTICAL MEMORY SENSING USING THERMAL MODULATION

Donald O. Smith, Lexington, Mass., assignor to Massachusetts Institute of Technology, Cambridge, Mass., a corporation of Massachusetts Filed July 26, 1967, Ser. No. 656,090
Int. Cl. G11b *11/10;* G11c *11/42*
U.S. Cl. 340—174.1 9 Claims

ABSTRACT OF THE DISCLOSURE

The sensing of information bits stored in a thin film magnetic memory is performed by phase detection of a magneto-optical signal which is thermally modulated by an intensity modulated electron beam. The electron beam is accurately deflected to select the bit storage area to be sensed and accurately focused to obtain bit storage areas of 1–5 micron size.

The invention herein described was made in the course of work performed under a contract with the Electronic Systems Division, Air Force Systems Command, United States Air Force.

At present magnetic-film memory systems sense the stored information by the voltage induced during flux reversal. A combination of factors which include demagnetizing fields, drive currents and thermal noise place an inherent limitation on the upper limit of the speed X bit-density product for the system. The search for large-capacity high-speed memories has encouraged investigators to explore other method of sensing. A number of papers have considered using an electron beam or an optical beam since the speed and facility of input and output are high when a large number of storage positions must be addressed. Mayer, J. Appl. Phys. 29, p. 1454, October 1958; Treves, J. Appl. Phys. 38, p. 1192, March 1967; Kump and Chang, IBM J. 10, 255, 1966; and Lee, Callaby, and Lynch, Proc. Phys. Soc. 72, 232, 1958 are representative of these studies.

The investigations reported in the prior art papers cited above show that electron beam widths of 1–20$\mu$ and $10^{-3}$ watts power can be expected to produce substantial temperature increments of the order of 20° at information rates of a microsecond with information densities greater than $10^7$/sq. in. While these figures are reported for systems which differ materially from the concepts of the present invention, they indicate clearly certain inherent advantages of a beam-operated memory system.

Two problems have been encountered which limit the usefulness of beam techniques applied to memory systems, namely, (1) sufficiently wideband high-resolution light deflection is not yet available for memory addressing, and (2) the interaction of electrons with ferromagnetic spins is too weak to provide a practical means of memory information sensing. The present invention seeks to overcome these two problems as follows: an electron beam is used to store information in a magnetic film by thermal writing which can be done at high speed and resolution; sensing is done by the combined use of an electron beam and a light beam in which the magneto-optical signal is thermally modulated by an intensity modulated electron beam.

A suitable magnetic film is set up as an anode in a cathode ray tube-like device. The electron beam can be focused to a very small beam width and deflected very accurately to control the position of the beam and in consequence is well adapted to address any one of a large array of information storage positions. The area of magnetic film upon which the electron beam is focused absorbs power from the beam and is heated thereby. The nature of the thermal response of the film is dependent on a number of factors such as the thermal diffusion distance for cooling, the thermal diffusion distance for heating, the absorbed power, the area of the beam, the duration of the heating period, the duration of the cooling period, the initial temperature level and the steady state temperature level at the end of the cooling period. When the energy in the beam is delivered in a burst sufficiently short compared to the diffusion of heat through the film and substrate and if the beam diameter is small compared to the diffusion length for cooling, then the steady state temperature of the selected spot does not have an opportunity to build up. This condition can always be satisfied if the time interval between bursts of beam energy is made long enough. When the beam pulse time duration is short so that the diffusion length for heating is less than the beam diameter, a configuration is provided for efficient incremental heating. As long as the beam diameter and the thermal diffusion lengths for heating and cooling are all large compared to the thickness of the film, these concepts are valid.

The idea of thermal modulation is dependent on the variation of magnetism, and hence also the magneto-optical effects, with temperature. For most magnetic materials the magnetization decreases with temperature. This variation is gradual at low temperature but becomes very rapid with increasing temperature, falling steeply to zero at a temperature commonly known as the curie point. Now when a very small spot on a very thin magnetic film is irradiated by a finely focused electron beam which is intensity modulated at a high frequency, the absorbed beam power causes the temperature of the spot to fluctuate at the modulation frequency and the magnitude of the magnetization of the irradiated spot also fluctuates at the modulation frequency.

The magneto-optical effect is used to sense the magnetic state of the spot which is irradiated by the modulated electron beam. It is interesting to point out that the area of the electron irradiated spot is not limited by the optical diffraction limit, which is of the order of the light wavelength. Because of optical diffraction the position of spots smaller than the wavelength of light cannot be determined from the magneto-optical signal. However, in present invention the spot position is not determined optically but by the controlled position of the electron beam. Only the magnetic state of the spot (1 or 0) is determined optically, and this information will be carried by the optical beam even for areas smaller than the diffraction limit.

While an electron beam width of the order of 1 micron is a practical value in order to obtain a high density of information storage areas, the problems associated with high resolution light deflection are simplified by using a light beam-width considerably greater. The ultimate signal-to-noise ratio (SNR) is limited by the allowable total temperature rise due both to the electron-beam modulation heating which generates the output signal and the light-beam heating which is an unwanted effect arising from optical absorption in the memory film and its substrate. Since the electron-beam modulation and power can be controlled to provide any desired temperature rise, the principal problem is associated with light-beam heating. As noted above, the width of the light beam is large compared to the width of the electron beam. Hence the light beam-width will also be large compared to the thermal diffusion distance for cooling. The average absorbed power from the light beam is limited by the condition that the magnetization of the information storage areas must not be disturbed by the light beam. When the light beam is pulsed, and if the base line temperature is taken to be the temperature level at the end of a cooling period, then the pulse duration time must be short compared to the cooling period to keep the base-line temperature from becoming the determining factor in the film temperature. Using a mode-locked laser, very short high-power light pulses can be obtained with a time duration of less than $10^{-11}$ sec. at a 100 mHz. rate.

Consider the electron beam to vary sinusoidally according to $I_e=I_0(1-\cos \omega t)$, while the light beam consists of narrow pulses from a mode-locked laser occurring with frequency $2\omega$. Then a number of different magneto-optical systems for signal detection can be used of which two representative examples follow:

(1) Take the magnetization of the film at right angles to the incident light beam which is polarized with the electric vector parallel to the plane of incidence. Then the reflectivity R depends on the direction of the magnetization according to the general expression $$R=R_0[1+Q(\vec{M})]$$

where $R_0$=reflectivity in the absence of magneto-optical effects and $$Q(\vec{M})=-Q-(\vec{M})$$

On the basis that Q is a function of temperature so that Q is modulated at the same frequency as the electron beam, it follows directly that the pulses of light beam reflected from the magnetic film will be modulated at the electron beam frequency and that the phase of the modulation relative to the electron beam depends on the magnetization direction of the interrogated area and hence the value of the stored information.

(2) Alternatively, take the magnetization of the film in the same direction as the light beam which can be polarized either parallel or perpendicular to the plane of incidence but for this example will be taken parallel to the plane of incidence. Then, if the transmission axis of an analyzer is oriented at an angle $+\theta$ to the plane of incidence, the pulses of light from the analyzer will be modulated at the electron beam frequency and the phase of the modulation relative to the electron beam depends on the magnetization direction of the interrogated area and hence on the value of the stored information.

The smallest bit which can be interrogated in a given interval of time, $\Delta t$, is determined by noise in the detection system. The noise sources which are usually encountered arise from the statistics of random events and this type of noise is generally referred to as shot noise. Shot noise is characterized by a uniform frequency distribution of noise power so that the total noise power is proportional to the bandwidth, that is $$\text{shot noise} \propto \Delta f$$

In order to understand the limitations on bit detectability imposed by shot noise it is necessary to identify the physical processes which introduce such noise into the proposed memory system. First consider the photon beam. A photon beam from a thermal source is generated by random emission of photons and hence is a source of shot noise. Since a laser source is in some sense coherent, the noise characteristics are quite different from the noise from thermal sources. In fact, recent studies have shown that for single mode CW lasers the noise depends on frequency according to $$\text{laser noise} \propto \frac{1}{f^2+\text{const.}} \Delta f$$

Hence, qualitatively the noise decreases with increasing frequency; numerically it is found that for a frequency greater than about 1 MHz that laser noise has fallen below the shot noise which is generated in presently-available photo detectors.

As just indicated above, a second source of noise is due to the photo detector. For a photo emissive cathode, the number of photo electrons emitted per photon is statistically random and hence leads to a source of shot noise. Hence at first sight it is not clear that the lack of noise on the laser beam can lead to any practical advantage. However, for the memory system under consideration advantage can be taken of the fact that the noise is introduced at the photo-detector and is not present on the laser beam. This is accomplished by using an interferometer to separate the background light from the signal light, and will be described below.

With the foregoing background information, the exact nature of the invention will be better understood from the following description and the accompanying drawing in which.

Figure 1:
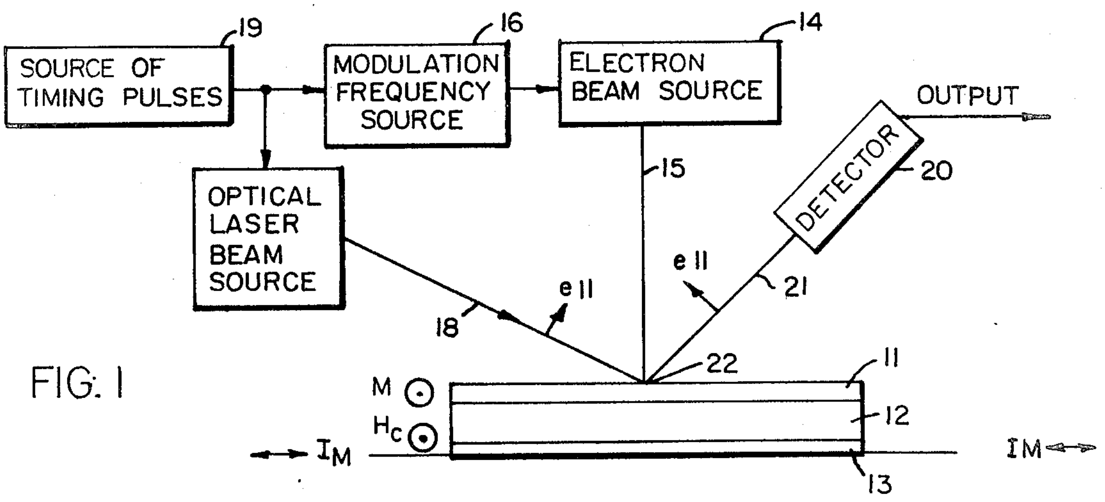
FIG. 1 is a block diagram illustrating one embodiment of the invention.

Referring to FIG. 1, a thin film of magnetic material 11 is shown deposited on one surface of a substrate 12, which may be made of glass, and on the opposite surface of the substrate 12 there is an electrical conductor 13. It is suggested that the composite structure of magnetic film, substrate and conductor is set up in the position of anode or screen in a cathode ray tube-like structure, which is not illustrated. Since suitable electron gun structures, electronic lenses, and electron beam deflection systems are not in themselves a part of the present invention and are amply described in the prior art, electron beam source 14 and electron beam 15 represents such structure. Similarly, since the production of a pulsed optical laser beam and the apparatus for obtaining high resolution light deflection are within the scope of the prior art, optical laser beam source 17 and light beam 18 are shown in block diagram. A source of timing pulses 19 is shown for the purpose of obtaining the desired frequency and phase relationships between the electron beam modulation and the pulsed light source. A high frequency source of modulating signal 16 is shown connected to the electron beam source 14. Finally, a photo-detector 20 is shown located to intercept the light beam 21 reflected from the surface of magnetic film 11. Both the electron beam and the light beam are shown focused so that they overlap on the same selected spot 22.

The operation of "writing" data into the memory system is readily seen with the aid of FIG. 2A, which shows the variation of magnetism with temperature, decreasing with temperature, slowly at low temperature and with increasing rapidity with increasing temperature and falling steeply to zero at a temperature commonly called the Curie point.

When a pulsed beam of electrons is focused on spot 22 of magnetic film 11, the pulsed beam raises the temperature of the film spot, as discussed above. The threshold field required to switch the state of magnetization of the heated spot is thereby lowered below the threshold field required to switch the remainder of the film. An information carrying external magnetic field is applied to the film with a magnitude below the ambient temperature threshold but high enough to switch the irradiated spot. When the electron beam is switched off, the irradiated spot 22 will retain a state of magnetization corresponding to the external field. The external field is furnished by supplying a current $I_M$ of the required direction of flow to conductor 13 from a suitable source not shown in the drawing. The direction of current flow establishes the direction of the external magnetic field which in turn determines the sense of the stored information. The pulsed electron beam may then be positioned to any other spot address on the magnetic film where information is to be stored.

While the writing operation requires only the use of the electron beam to select the storage location and an external field to present the sense of the stored data, reading or sensing the magnetic state of a selected storage location requires the combined use of the electron beam and the optical beam.

Figure 3:
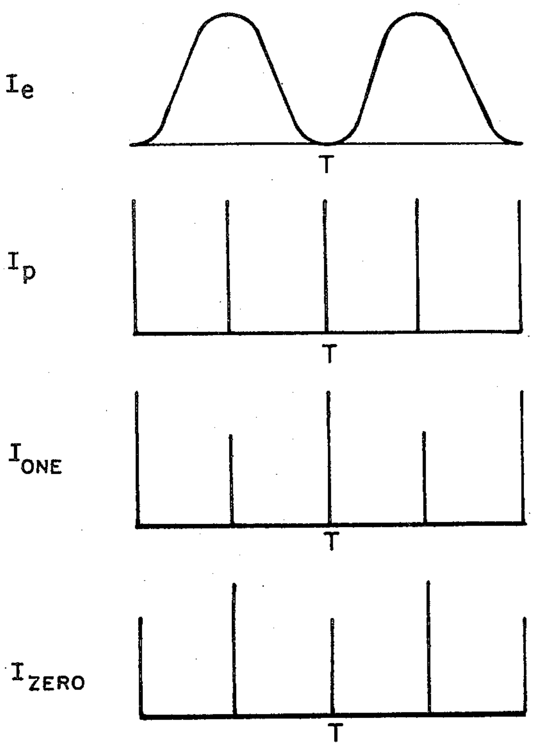
FIG. 3 is a graph showing the frequency and phase relationships between the electron beam modulation, the light beam pulses, and the detector output signal.

Referring now to FIG. 3, the electron beam is shown to be varied sinusoidally according to $I_e=I_0(1-\cos \omega t)$ while the light beam $I_p$ consists of very narrow pulses from a mode-locked laser occurring with frequency $2\omega$.

FIG. 1 illustrates the case of the magnetic film magnetized at right angles to the incident light beam (perpendicular to the plane of the paper) and in which the light beam is polarized with the electric vector $e_{11}$ parallel to the plane of incidence. The information stored as the magnetic state of the irradiated spot is transferred to the reflected light beam due to the fact that the reflectivity R depends on the direction of magnetization according to the general expression $$R=R_o[1+Q(\vec{M})]$$

where $R_0$ is the reflectivity in the absence of magneto-optical effects and $$Q(\vec{M})=-Q(-\vec{M})$$

Figure 2:
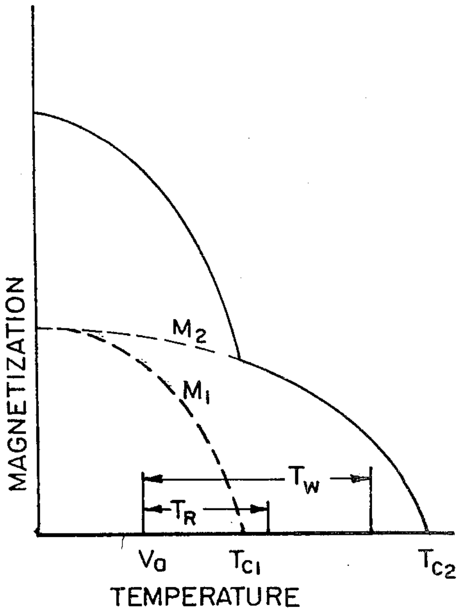
FIG. 2 is a graph showing the magnetization vs. temperature curve of a magnetic film.

When the selected spot is irradiated by the modulated electron beam and by the pulsed optical beam, the output signal detected from the reflected light beam will be proportional to the incremental magneto-optical coefficient defined by:

$$\delta k=\frac{\partial k}{\partial t}\,\delta t$$

where $k$ is the magneto-optical coefficient and $t$ is the temperature. It is clear from FIG. 2 that operation near the curie point $T_c$ is a sufficient condition to insure that $\delta k$ is large, of the same order of magnitude as $k$. However, it is also necessary that in the region of temperature where $\delta k$ approaches $k$, the coercive force remains higher than some minimum value $H_{min}$ to keep the state of the storage spot from being switched. A problem then arises since, of course, the coercive force goes to zero at the curie point. A solution to the above problem is shown in FIG. 2, which shows schematically the magnetization curve of a composite film consisting of two layers 1 and 2 having magnetization curves $M_1$ and $M_2$ with curie temperatures $T_{C1}$ and $T_{C2}$. Reading and writing then involve temperature excursions $T_R$ and $T_W$, respectively, and now no loss of information during reading can occur. The selection of materials to obtain a magnetization curve of this type is straightforward to those skilled in the art of magnetism. For example, a suitable pair of materials might be Gd and Ni, with curie points of ~15° C. and ~350° C., respectively.

On the basis that the magneto-optical coefficient is a function of temperature, and that the modulated electron beam causes the temperature of the selected spot to vary at the modulation frequency, it follows that the pulses of light reflected from the magnetic film will be modulated at the electron beam modulation frequency and that the phase of the modulated light beam depends on the magnetization direction of the interrogated area and hence the value of the stored information. This is illustrated in FIG. 3 as $I_{one}$ and $I_{zero}$. It should be noted that this method of sensing the magnetic state of the selected spot does not require an analyzer in the reflected beam 21.

Figure 4:
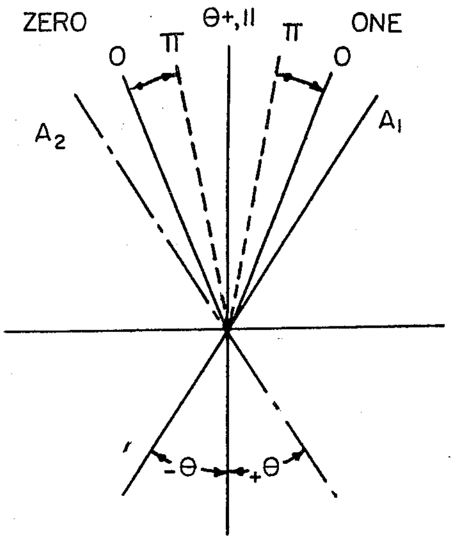
FIG. 4 is a vector diagram of sensing using an analyzer.

However, there are some advantages to be gained from the use of an analyzer in the reflected beam, particularly with regard to a reduction or a cancellation of various types of noise, such as laser noise and surface noise. If an analyzer is used, the incident light beam can be polarized with parallel or perpendicular to the plane of incidence and the magnetization of the film can be either polar or longitudinal with respect to the plane of incidence. FIG. 4 illustrates by vector diagram this method of detection. With an analyzer $A_1$, as shown, the $I_{zero}$ and $I_{one}$ are again shown in FIG. 3.

Figure 5:
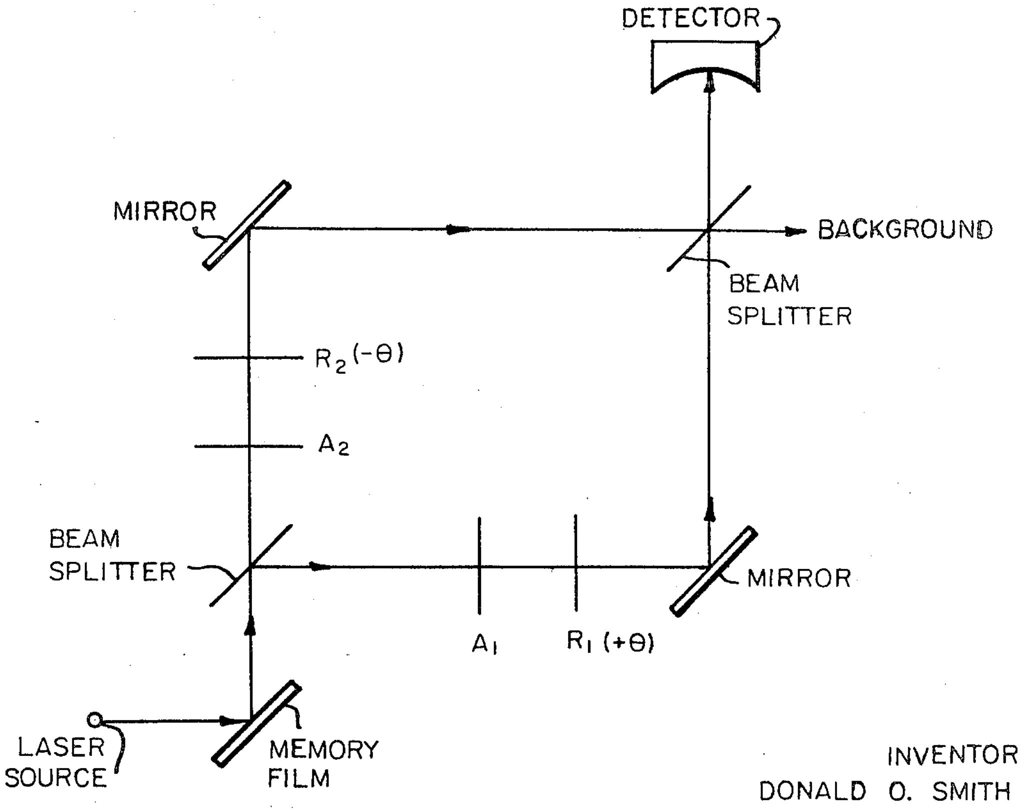
FIG. 5 is a diagram of the interferometer method to separate background light from the magneto-optical signal.

Referring now to FIG. 5, if the reflected light is divided into two channels using a beam splitter and separate analyzers $A_1$ and $A_2$ placed in each channel and oriented as shown on the diagram, then a differential amplifier connected to photo-detectors placed after analyzer $A_1$ and $A_2$ (not shown) can be used to cancel surface noise. Still referring to FIG. 5, when the output of each analyzer is fed to a rotator ($R_1$ and $R_2$) which impart rotations of $+\theta$ and $-\theta$ respectively to the polarization of the reflected beam and the two channels are optically combined by a second beam splitter positioned to cause optical interference, the noise is canceled in one output channel and the magneto-optical signal is sent to a photo-detector, and the background noise, separated from the signal is found in the second output of the beam splitter. Furthermore, the shot noise generated at the cathode of the photo-detector is now reduced, since the background light does not reach the detector.

It will be appreciated that the specific embodiments described are merely illustrative of the general principles of the invention. Various modifications may be devised without departing from the scope of the disclosure.

What is claimed is:

1. The method of generating a modulated magneto-optical signal comprising the steps of:

(1) Applying an intensity modulated electron beam to a portion of a magnetic film to cause the temperature and hence the magneto-optical properties of the irradiated portion to fluctuate in accordance with the power absorbed from the beam, (2) concurrently illuminating said irradiated portion of the magnetic film with a beam of polarized optical energy, (3) detecting the thermally modulated magneto-optical signal present in the reflected optical beam.

2. The method of claim 1 applied to the sensing of information stored as the direction of magnetization in a selected spot in a thin film of magnetic material wherein said electron beam is deflected to select a particular information storage spot in the film, and wherein the information stored in the selected spot is transferred to the optical beam reflected from the spot as a fluctuation in the intensity of the reflected beam.

3. The method of claim 1 wherein said intensity modulated electron beam is focused to a diameter less than the thermal diffusion distance in the film.

4. The method of claim 1 wherein the said beam of optical energy is in the form of pulses having a time duration short compared to the time interval between pulses.

5. The method of claim 1 applied to the sensing of information stored as the direction of magnetization in a selected spot in a thin film of magnetic material wherein said electron beam is deflected to select a particular information storage spot in the film, and wherein the information stored in the selected spot is transferred to the optical beam reflected from the spot as a fluctuation in the direction of polarization of the reflected beam.

6. The method of claim 2 wherein the magnetization of the magnetic film is at right angles to the plane of incidence of the optical beam which is polarized with the optical electrical field in the plane of incidence such that the state of magnetization of the selected spot is determined by the phase of the magneto-optical signal relative to the phase of the electron beam intensity modulation.

7. The method of claim 5 wherein the magnetization of the magnetic film is in the plane of incidence of the optical beam which is polarized either perpendicular or parallel to the plane of incidence and in which an analyzer is oriented in the path of the reflected beam with its axis of transmission at an arbitrary angle from the plane of incidence of the optical beam such that the state of magnetization of the selected spot is determined by the phase of the magneto-optical signal relative to the phase of the electron beam intensity modulation.

8. The method of claim 2 wherein said electron beam is modulated sinusoidally and wherein said beam of optical energy is in the form of pulses originating from a mode-locked laser and occurring with a frequency twice that of the electron beam modulation.

9. The method of claim 2 wherein said thin film of magnetic material includes two different magnetic materials with different curie points such that thermal fluctuations of said film do not change the magnetic state of the selected information storage spot.

References Cited

UNITED STATES PATENTS

| | | | |
|---|---|---|---|
| 3,164,816 | 1/1965 | Chang | 340—174.1 |
| 3,174,140 | 3/1965 | Hagopian | 340—174.1 |
| 3,268,879 | 8/1966 | Lins | 340—174.1 |
| 3,445,826 | 5/1969 | Myers | 340—174.1 |

TERRELL W. FEARS, Primary Examiner

U.S. Cl. X.R.

350—151